Feb. 16, 1926.　　　　　　　　　　　　　　1,573,214
A. D. WYCKOFF
METHOD OF AND MEANS FOR LUBRICATING WASTE
Filed Feb. 26, 1923　　　2 Sheets-Sheet 1
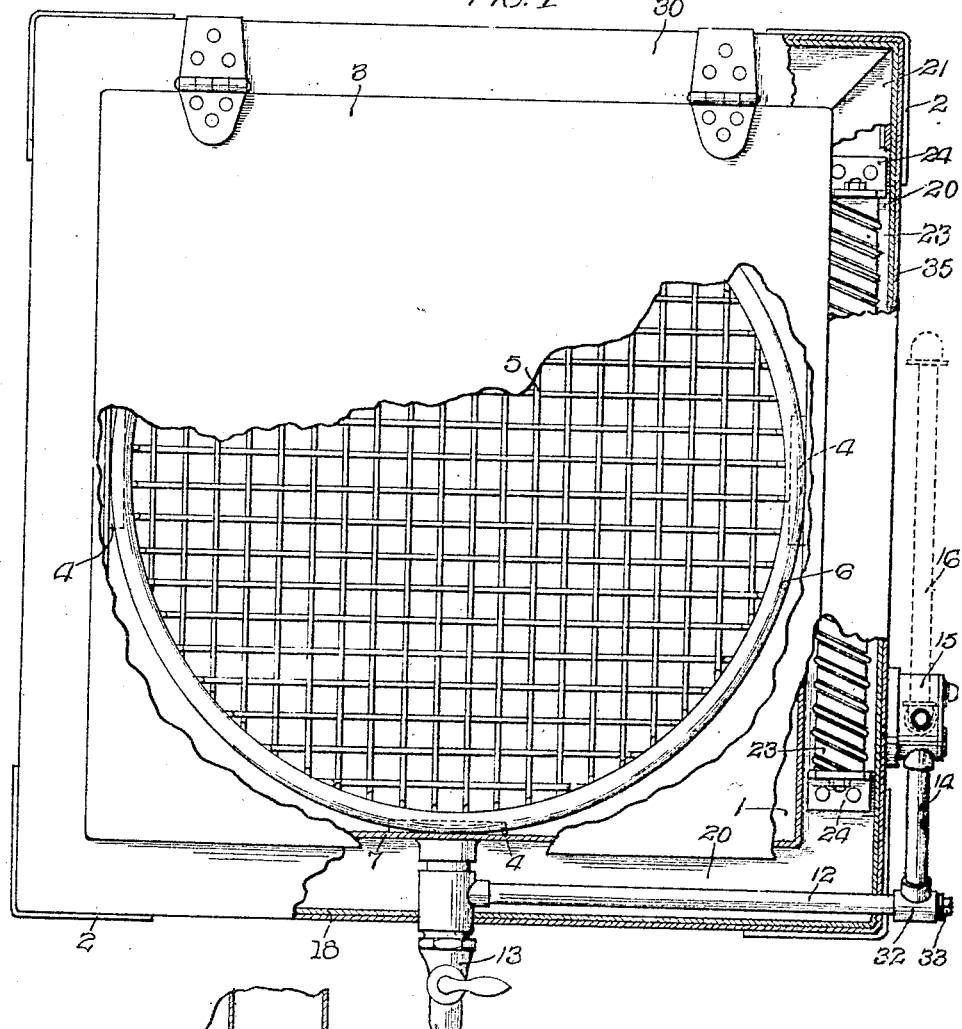
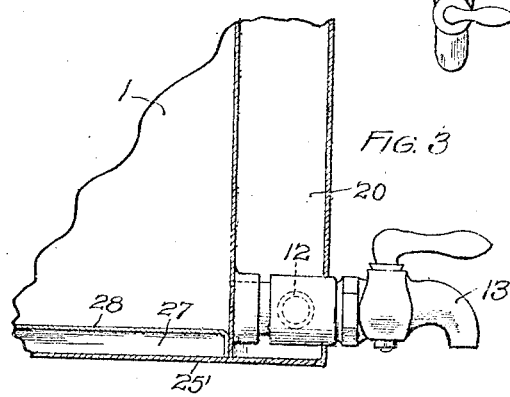
INVENTOR:
Andrew D. Wyckoff.
By Jones, Addington, Ames & Seibold
ATTYS Feb. 16, 1926. 1,573,214
A. D. WYCKOFF
METHOD OF AND MEANS FOR LUBRICATING WASTE
Filed Feb. 26, 1923 2 Sheets-Sheet 2
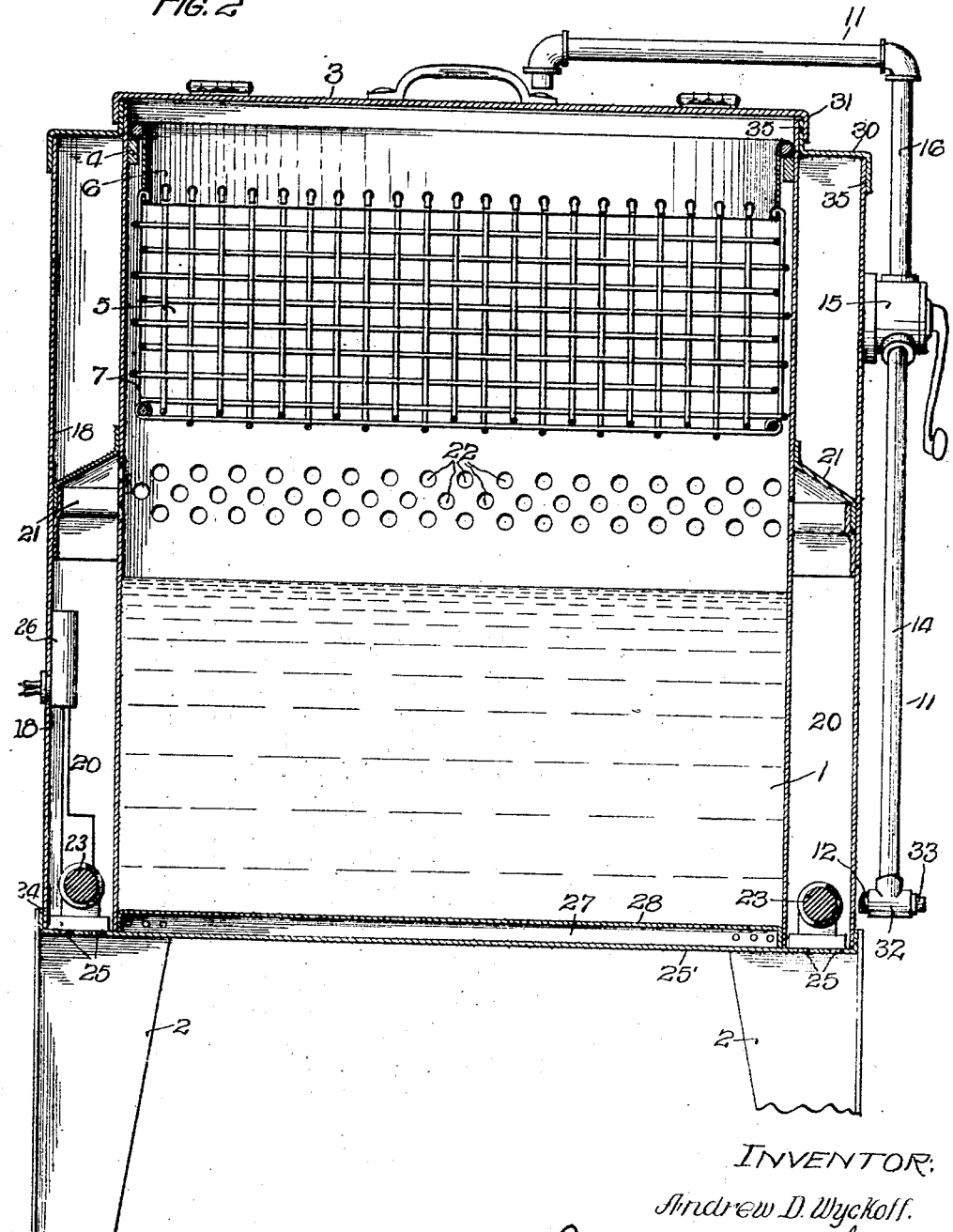
INVENTOR:
Andrew D. Wyckoff.
By Jones, Addington, Ames & Seibold,
ATTYS.

Patented Feb. 16, 1926.

1,573,214

UNITED STATES PATENT OFFICE.

ANDREW D. WYCKOFF, OF OAK PARK, ILLINOIS.

METHOD OF AND MEANS FOR LUBRICATING WASTE.

Application filed February 26, 1923. Serial No. 621,143.

*To all whom it may concern:*

Be it known that I, ANDREW D. WYCK-OFF, a citizen of the United States, residing at Oak Park, in the county of Cook and State of Illinois, have invented new and useful Improvements in Methods of and Means for Lubricating Waste, of which the following is a full, clear, concise, and exact description, reference being had to the accompanying drawings, forming a part of this specification.

My invention relates to the method of and means for saturating lubricant waste for use in car journals, or other bearings, where this form of lubrication is desirable.

Waste saturated with lubricant will not function efficiently to lubricate bearings if it has been oversaturated. Nor will it function efficiently if the lubricant has not thoroughly penetrated the waste.

In the saturation of waste, many difficulties have been experienced. Lubricant used for this purpose is usually heavy, and therefore, if allowed to become cold, it easily obtains a viscosity too high to permit of ready absorption by the waste. As heretofore accomplished, waste was commonly dipped into an open vat containing lubricant and upon the judgment of the attendant, it was removed and placed upon a drain-screen. When believed to be sufficiently drained, the waste was removed. Thus it is apparent that variations as to the specifications of the lubricant, the temperature of the same, and also the temperatures of the oil houses or other locations where waste was saturated, were not properly accounted for in the saturation of the waste. It has, therefore, been found that waste saturated by this method contains an excess of lubricant, usually above the amount required by good engineering practice for proper and efficient lubrication.

My invention provides for an improved device for saturating waste with lubricant at a temperature suitable for reducing the lubricant to a viscosity which will readily and quickly perform complete saturation.

An object, therefore, of my invention is to provide in this device a carrier or basket for the waste, and to feed a charge of lubricant thereto, and while this lubricant is draining or percolating therethrough, and being absorbed by the waste, to circulate currents of warm air into and about the carrier or basket whereby to condition the waste and remove it from the basket in the desired state of saturation.

A further object is the provision of an improved heating device, being so arranged that an economy of heat is effected, by disposing this device adjacent the body of lubricant in the tank, and consequently effectively utilizing a part of the heat to keep this body of lubricant at a viscosity which permits of ready absorption.

These and other objects of my invention will readily appear from a detailed description and illustration of a preferred embodiment of my invention.

In the drawings:

Figure 1 is a top plan view of the device with portions thereof broken away;

Fig. 2 is a vertical sectional view of the same; and,

Fig. 3 is a detail sectional view of a part of one corner of the tank and heating chamber to illustrate a drain faucet.

Referring more particularly to the drawings, the device embodying my invention comprises a tank 1, suitably supported upon legs 2 and provided with a hinged cover 3 for closing the open end thereof. Within the tank 1, stationary blocks 4 are provided for carrying, in suspended relation, a waste carrying basket 5, adapted for the reception of waste during the saturation thereof by the lubricant. The waste carrying basket 5 comprises a wire reticulated portion 7, in which the waste is placed, and a receptacle 6, forming a non-foraminous rim about the upper end thereof, for allowing the lubricant as it is fed to the waste to form a puddle thereover, in order that even percolation of and saturation by the lubricant will result throughout the waste.

A supply of lubricant is placed within the tank, the level of this lubricant preferably being brought to a height as shown in Fig. 2.

In order that a charge of lubricant from this supply may be fed to the waste in the basket 5, a by-pass 11 is provided. By-pass 11 comprises a horizontal pipe 12 extending outwardly through one side of the device from a faucet 13, a vertical pipe 14 leading to a pump 15, and a swivelly mounted pipe 16 at the opposite side of the pump. The pipe 16 is adapted to swing over the upper end of the tank 1, while the cover 3 is open, to direct the lubricant to the waste in the basket. During the saturating step, the pipe 16 is swung to a position shown in dotted lines in Fig. 1, and the cover 3 is closed. Thus it is obvious that this by-pass 11 functions to feed the necessary lubricant to each batch of waste placed in the basket, by by-passing the lubricant around this supply, at the lower end of the tank, to the open end thereof, where it is allowed to spread in a puddle over the waste.

It will be noted that faucet 13 will also serve the function of draining the tank of the lubricant, should it be desired to empty or clean the tank, or to change the lubricant therein.

Tank 1 is preferably rectangular and is disposed within a container 18, which I have in this showing also made rectangular but of a larger cross dimension than that of the tank, in order that a heat generating chamber 20 will be formed between the two.

In the chamber 20, a baffle member 21 is disposed at a suitable point above the normal level of the lubricant, so as to direct the warm air, which tends to rise in the chamber 20, through apertures 22 provided in the wall of the tank 1. Any form of heat generating device may be employed in this chamber.

In the present showing, a pair of electrical heat coils 23 is provided, one on each side of the device, being carried by a pair of brackets 24 suitably secured to base 25' of the container 18. Directly below the heat coils 23 are provided a plurality of ventilation openings 25, which admit air to the chamber 20 and provide a natural circulation, the coils 23 tending to heat the fresh air as admitted whereupon it will rise and be deflected through the aperatures 22 by the baffle member 21. It will be noted that upon entering the interior of tank 1, the warm air will circulate upwardly and tend to heat thoroughly the waste in the basket 5, and consequently the lubricant as it seeps or percolates through the waste. It will be observed at this point in the description, that after the waste has been saturated, the excess lubricant will drain into the tank 1, and the warm air will thereafter condition the waste by leaving it in a dry saturated state. To those skilled in the art, it is known that waste produced in this condition will contain only that amount of lubricant which provides for efficient lubrication.

I preferably utilize a thermostatic device 26 in the chamber 20 and electrically connect it in circuit with the heat coils so as to be able to cut out these coils automatically from the circuit when a predetermined temperature obtains in the chamber. The thermostatic device 26 will immediately cut in the heat coils in the circuit as soon as the temperature is again restored to normal condition, so that the temperature will be maintained constant.

The heat generating chamber 20 does not extend about the underside of the tank 1, but instead a dead air space 27 is provided by means of a raised floor 28, suitably secured to the lower end of the tank.

The baffle member 21 serves to close off the chamber 20 above the apertures 22. An annular cap member 30, having oppositely turned vertical flanges 35, is disposed at the upper end of the container 18, the downwardly turned flange overlapping the upper edge of the container, and the upwardly turned flange lying against and terminating flush with the edge of the open end of the tank 1. When the cover 3 is closed, its rim 31 overlaps this upwardly turned flange, so as to close off the tank tightly and thereby to retain the heat therein.

It is to be noted that the union 32 connecting pipe 12 with pipe 14 has been provided with a screw plug 33, at its outer end, and in direct alignment with pipe 12. Should the pipe 12 become clogged by foreign matter in the lubricant, the plug 33 may be removed and a wire (not shown) inserted to clean this pipe.

The operation of the device is as follows:

Assuming that lubricant has been poured in the tank 1, and the cover is open, waste is placed in the basket 5 to fill the wire portion 7 and the pump 15 is then operated, preferably manually, as shown in Fig. 2. The viscosity of the lubricant will prohibit it from soaking through the waste immediately. Consequently, it will spread about the waste, until the receptacle 6 is filled. The upper pipe 16 of the by-pass 11 is then swung to its dotted line position, as shown in Fig. 2, to permit the cover 3 to close. Heat generated by the heat coils 23 will tend to create a circulation of warm air in the chamber 20. This warm air will be deflected by the baffle member 21 through the apertures 22 into the interior of the tank 1, whereupon it will flow in and about the basket 5. The waste in the basket will become heated, the heat gradually penetrating the waste, so that, as the lubricant slowly passes therethrough, it will be absorbed with greater facility. After the lubricant has thus thoroughly saturated the waste, the heat will condition the waste, and when removed from the basket 5, it will be in the desired saturated state. It is to be noted that the heat not only penetrates the waste, but comes in contact with the lubricant to produce a viscosity which will readily permit the absorption of the lubricant by the waste.

Various forms of heat generating means may be provided, such for instance as an automatic steam heating equipment commonly used for such purposes.

From the foregoing, it will be apparent that I have provided for obtaining the objects of my invention in a simple, reliable and effective manner. I do not intend to be limited to the specific disclosure or precise utilities described, but aim to cover all modifications and adaptations coming within the scope of my invention, as set out in the appended claims. The particular arrangement of the waste supporting basket, or the manner of feeding a charge of lubricant to the waste in the basket, as well as the manner of supplying heat to the interior of the tank, or to condition the waste and lubricant, may be varied without departing from the spirit of the invention.

I claim:

1. In a waste-soaking tank, a combination of a receptacle forming an oil storage compartment in the bottom thereof, a basket adapted for the reception of waste, means for maintaining the viscosity of the oil constant during saturation of the waste and thereafter serving to condition the saturated waste to a substantial dryness, and means for supporting said basket over said oil storage compartment during saturation and conditioning, thereby permitting the saturation and conditioning of the waste to be substantially continuous in action.

2. In combination, a waste soaking tank having a body of lubricant therein, means for supporting the waste over the lubricant, means for feeding a charge of the lubricant to the waste, means for assisting in the absorption of the lubricant by the waste, said means comprising a hot air chamber provided with means for directing the hot air through the waste.

3. In a device for saturating lubricant waste, the combination with a container, of a tank mounted in spaced relation within said container to provide a hot air chamber surrounding the tank and having its walls extending above the walls of said container, means for heating the air in said chamber, a carrier adapted to be supported in the upper part of said tank, means for conducting the hot air to said carrier, a plurality of blocks secured to the interior of the tank for removably receiving said carrier and spacing the latter from the liquid in the tank, means for closing said container at its upper end, and a hingedly connected cover for said tank.

4. In a device of the class described, a tank having a body of liquid therein, a carrier supported in said tank for material to be saturated, said carrier being supported over said body of liquid, a by-pass for conveying part of said liquid to the top of said tank in order to drain through the material in said carrier, and a hot air chamber surrounding said tank and extending a substantial distance above the level of the liquid, said hot air chamber communicating with the interior of said tank.

5. In a device for saturating lubricant waste, the combination with a container, of a tank having its side and bottom walls spaced at a distance from the walls of said container whereby a hot air compartment is formed between the container and tank, blocks secured to the interior of said tank adjacent to its upper end, a carrier adapted removably to seat within said tank on said blocks, means comprising openings providing an air space between the liquid and said carrier and permitting communication between said air space and said hot air compartment to conduct the hot air to the waste in said carrier.

6. In a device of the class described, a tank having a body of liquid therein, a carrier supported in said tank for material to be saturated, said carrier being supported over said body of liquid, a by-pass for conveying part of said liquid to the top of said tank for saturating the material, a hot air chamber surrounding a portion of said tank, said chamber communicating with said tank at a point substantially above the level of the liquid in said tank.

7. In a device for saturating lubricating waste with a lubricant of a suitable viscosity, a tank having a body of lubricant therein, a carrier supported above the lubricant for waste to be saturated, means for delivering a charge of lubricant from said body to the waste, and means for conducting a current of warm air through said waste for maintaining the viscosity of the liquid constant during the saturation and thereafter for conditioning the saturated waste.

8. In a device for saturating waste with a suitable lubricant, a tank containing a body of lubricant, a carrier comprising a basket-like member supported in said tank for waste to be saturated, means for by-passing the lubricant around the lower end of said tank to the top of said carrier, a wall surrounding said tank, a heater between said wall and said tank, and means for providing a circulation of air past said heater and then into said tank above the level of the lubricant whereupon the heated air will come in contact with the waste and the lubricant saturating the waste.

9. In a device for saturating waste with a suitable lubricant, a tank having a body of lubricant therein, a carrier for waste to be saturated, means for by-passing lubricant around the lower end of said tank to the top of said carrier whereupon the lubricant will saturate the waste and drain back into said body of lubricant, a container in which said tank is disposed, said container providing a chamber about said tank, a heating element in said chamber, means for providing communication between said chamber and the interior of said tank, said container being provided with a plurality of venilation openings therein.

10. In a device for saturating waste with a suitable lubricant, a tank having a body of lubricant therein, a carrier for waste to be saturated, means for by-passing lubricant around the lower end of said tank to said carrier whereupon the lubricant will saturate the waste and drain back into said body of lubricant, means for providing a chamber about said tank, said tank being provided with openings therein to establish communication between the interior thereof and said chamber, and means for providing a circulation of warm air through said chamber, through said openings and into said tank.

11. In a device for saturating waste with a suitable lubricant, a tank having a body of lubricant therein, a carrier for waste to be saturated, means for causing the lubricant to flow over the waste in said carrier and to drain back into said body of lubricant, means for providing a heating chamber about said tank, temperature control means for said heating chamber, and means for establishing communication between said heating chamber and the interior of said tank whereby the waste and the lubricant saturating the same may be kept at a predetermined temperature.

12. In a device for saturating waste with a suitable lubricant, a tank having a body of lubricant therein, a carrier for waste to be saturated, means for circulating the lubricant over the waste in said carrier, means for providing a heating chamber to heat said body of lubricant, temperature control means for said heating chamber, said tank having openings therein, and baffle means for diverting the heated air in said chamber through said openings and into said tank.

13. In a device for saturating waste with a suitable lubricant, a tank having a body of lubricant therein, a carrier for waste to be saturated, means for circulating the lubricant over the waste in said carrier, means for providing a heating chamber to heat said body of lubricant, temperature control means for said heating chamber, said tank having openings therein, said openings being disposed above the level of said body of lubricant, and baffle means for diverting the heated air in said chamber through said openings and into said tank.

14. In a device for saturating waste with a suitable lubricant, a tank having a body of lubricant therein, a carrier for waste to be saturated, means for circulating the lubricant over the waste in said carrier, means for providing a heating chamber to heat said body of lubricant, said heating chamber being in communication with said tank, and baffle means for diverting the heated air in said chamber into said tank.

15. In a device for saturating waste with a suitable lubricant, a tank having a body of lubricant therein, a carrier for waste to be saturated, means for providing a heating chamber to heat said body of lubricant, said heating chamber being in communication with said tank, and baffle means for diverting the heated air in said chamber into said tank.

16. In a device for saturating waste with a suitable lubricant, a tank having a body of lubricant therein, a carrier for waste to be saturated, means for circulating the lubricant over the waste in said carrier, an outer wall spaced circumferentially about said tank, a partition between said wall and said tank for dividing the space therebetween into a plurality of compartments, means for converting one of said compartments into a heating chamber, said heating chamber being adjacent that part of the tank containing the body of lubricant, the other compartment serving as a dead air space and being adjacent that part of the tank containing said carrier.

17. In a device of the class described, a tank adapted to contain a body of lubricant therein, and a removable reticulated basket suspended in said tank over said body of lubricant for the material to be saturated, said basket including a receptacle at the upper end of its reticulated portion in which the lubricant in surplus of that initially absorbed or soaked by the material may be temporarily retained, said reticulated portion of the basket being of a depth substantially equal to that of the material to permit a circulation of air through the sides of said basket and material.

18. In a device of the class described, a tank adapted to contain a body of lubricant therein, a removable basket suspended in said tank over the body of lubricant, said basket including a reticulated portion for receiving the material to be saturated and a non-reticulated portion directly thereabove for retaining the lubricant not initially absorbed or soaked by the material, said reticulated portion being of a substantial depth for permitting a circulation of air through the sides of said basket and the material therein.

In witness whereof, I have hereunto subscribed my name.

ANDREW D. WYCKOFF.